(12) United States Patent
Woollen (10) Patent No.: US 7,707,572 B2
(45) Date of Patent: Apr. 27, 2010

(54) SYSTEM AND METHOD FOR APPLICATION CONTAINER ARCHITECTURE

(75) Inventor: Rob Woollen, San Francisco, CA (US)

(73) Assignee: BEA Systems, Inc., Redwood Shores, CA (US)

( * ) Notice: Subject to any disclaimer, the term of this patent is extended or adjusted under 35 U.S.C. 154(b) by 914 days.

(21) Appl. No.: 11/132,519

(22) Filed: May 19, 2005

(65) Prior Publication Data

US 2005/0267856 A1 Dec. 1, 2005

Related U.S. Application Data

(60) Provisional application No. 60/572,645, filed on May 19, 2004.

(51) Int. Cl.
*G06F 9/445* (2006.01)

(52) U.S. Cl. .................................. 717/177; 717/175

(58) Field of Classification Search .................. 717/106, 717/107, 108, 140, 141, 142, 168, 169, 170, 717/171, 172, 173, 174–178
See application file for complete search history.

(56) References Cited

U.S. PATENT DOCUMENTS

| | | | | |
|---|---|---|---|---|
| 5,835,777 | A | * 11/1998 | Staelin | ........................ 717/175 |
| 5,911,071 | A | 6/1999 | Jordan | |
| 6,128,647 | A | 10/2000 | Haury | |
| 6,529,992 | B1 | 3/2003 | Thomas | |
| 6,721,777 | B1 | * 4/2004 | Sharma | ........................ 718/101 |
| 6,751,797 | B1 | 6/2004 | Desgranges | |
| 6,766,324 | B2 | 7/2004 | Carlson | |
| 6,829,575 | B2 | 12/2004 | Freund | |
| 6,892,382 | B1 | * 5/2005 | Hapner et al. | ................ 717/174 |
| 6,970,924 | B1 | 11/2005 | Chu | |
| 7,069,553 | B2 | 6/2006 | Narayanaswamy | |
| 7,086,065 | B1 | 8/2006 | Yeluripati | |
| 7,107,592 | B2 | 9/2006 | Taylor | |
| 7,127,713 | B2 | 10/2006 | Davis et al. | |
| 7,185,071 | B2 | 2/2007 | Berg et al. | |
| 7,228,541 | B2 | * 6/2007 | Gupton et al. | ............... 717/175 |
| 7,246,104 | B2 | 7/2007 | Stickler | |
| 7,302,609 | B2 | * 11/2007 | Matena et al. | ................. 714/15 |
| 2002/0049744 | A1 | 4/2002 | Nakos | |
| 2002/0078132 | A1 | 6/2002 | Cullen | |
| 2002/0178439 | A1 | 11/2002 | Rich et al. | |
| 2003/0005093 | A1 | 1/2003 | Deboer | |

(Continued)

OTHER PUBLICATIONS

Mencl et al., "Enhancing EJB Component Model"; Academy of Sciences of the Czech Republic, 2001, 11 pgs.*

(Continued)

*Primary Examiner*—Wei Y Zhen
*Assistant Examiner*—Ryan D Coyer
(74) *Attorney, Agent, or Firm*—Fliesler Meyer LLP (57) ABSTRACT

There are provided mechanisms and methods for enabling the deployment of applications into new execution environments by adding extensions to base deployment capability for each of the new containers. These mechanisms and methods can enable embodiments to instantiate modules that augment deployment and/or execution environments for applications being deployed. The ability of embodiments to provide augmented deployment and/or execution environments can enable server embodiments to become more flexible environments from the point of view of developers seeking to implement applications on the server.

16 Claims, 6 Drawing Sheets

U.S. PATENT DOCUMENTS

| | | | |
|---|---|---|---|
| 2003/0093717 | A1 | 5/2003 | Mason |
| 2003/0101435 | A1* | 5/2003 | Takahashi et al. ........... 717/120 |
| 2003/0158919 | A1 | 8/2003 | Fomenko |
| 2003/0204784 | A1* | 10/2003 | Jorapur ........................ 714/38 |
| 2003/0212990 | A1 | 11/2003 | Brodkorb |
| 2004/0068553 | A1 | 4/2004 | Davis |
| 2004/0068731 | A1* | 4/2004 | Davis et al. ................. 719/310 |
| 2004/0088681 | A1 | 5/2004 | Berg |
| 2004/0255294 | A1 | 12/2004 | Spotwood |
| 2005/0033767 | A1 | 2/2005 | Kamentz |
| 2005/0137856 | A1 | 6/2005 | Cencini et al. |
| 2005/0138076 | A1 | 6/2005 | Seo |

OTHER PUBLICATIONS

Popovici et al., "Spontaneous Container Services", ECOOP 2003, LNCS 2743, 2003, pp. 29-54.*

Sun Microsystems Enteprise JavaBeans™ Specification, Version 2.1, Final Release, Nov. 12, 2003.

Chappell, Dave, et al., "Java Message Service," O'Reilly, Dec. 2000.

Taylor, Art, "J2EE™ and Beyond: Design, Develop, and Deploy World-Class Java™ Software," Prentice Hall, Dec. 23, 2002.

Guo, Yike, et al., "Developing a distributed scalable Java component server," Future Generation Computer Systems, May 24, 2001, vol. 17, Issue 8, pp. 1051-1057.

Microsoft Computer Dictionary, Fifth Edition, Microsoft Press, 2002, pp. 115, 176, 542.

Vecellio, Gary, et al., "Container Services for High Confidence Software," Seventh International Workshop on Component-Oriented Programming, Jun. 10-14, 2002.

Hess, Christopher, et al., "An Adaptive Object Service for Pervasive Computing Environments," Dec. 4, 2000, pp. 1-27.

International Search Report for PCT/US05/14430 dated July 27, 2005.

Written Opinion for PCT/US05/14430 dated Jul. 27, 2005.

* cited by examiner

SYSTEM AND METHOD FOR APPLICATION CONTAINER ARCHITECTURE

PRIORITY CLAIM

The present application claims the benefit of:
U.S. Provisional Patent Application No. 60/572,645 entitled SYSTEM AND METHOD FOR APPLICATION CONTAINER ARCHITECTURE, by Rob Woollen, filed on May 19, 2004, which is hereby incorporated by reference in its entirety.

CROSS-REFERENCE TO RELATED APPLICATIONS

The present application relates to the following applications, which are hereby incorporated by reference in their entirety:

U.S. patent application Ser. No. 10/961,261 entitled SYSTEM AND METHOD FOR UNIFIED FILE MANAGEMENT, by Rob Woollen, filed on Oct. 8, 2005;

U.S. patent application Ser. No. 10/969,089 entitled SYSTEM AND METHOD FOR APPLICATION LIBRARIES, by Rob Woollen, et al., filed on Oct. 20, 2004;

U.S. patent application Ser. No. 10/962,133 entitled SCOPED APPLICATIONS, by Rob Woollen, filed on Oct. 8, 2004;

U.S. patent application Ser. No. 10/961,304 entitled SYSTEM AND METHOD FOR CUSTOM MODULE CREATION AND DEPLOYMENT, by Rob Woollen, filed on Oct. 8, 2004; and U.S. patent application Ser. No. 11/128,908 entitled SYSTEM AND METHOD FOR WEB APPLICATION EXTENSIBILITY, by Mark Griffith, et al., filed on May 13, 2005.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to implementations of a server architecture. More particularly it refers to an architecture for deploying modules in a server environment.

BACKGROUND OF THE INVENTION

Since its inception in 1995, the Java™ programming language has become increasingly popular. (Java™ is a trademark of Sun Microsystems, Inc.) Java, which is an interpreted language, enabled the creation of applications that could be run on a wide variety of platforms. This ability to function across a variety of different client platforms, i.e., platform independence, and Java's relatively easy implementation of network applications has resulted in its use in endeavors as basic as personal web pages to endeavors as complex as large business-to-business enterprise systems.

As Java has become more commonplace, a wide variety of tools and development platforms have been created to assist developers in the creation and implementation of applications based upon Java as well as other programming languages offering platform independence. These tools and development platforms allow users to work with previously generated modules, thus reducing overlapped efforts.

However, conventional tools and development platforms have added additional rigidity into the development process. Conventional approaches often limit developers to modules or module types having code that is shipped with the tool or development platform. Thus, developers using conventional tools and development platforms are often unable to use customized modules or execution environments without significant additional effort.

DETAILED DESCRIPTION

In accordance with embodiments, there are provided mechanisms and methods for enabling the deployment of applications into new execution environments by adding extensions to base deployment capability for each of the new containers. These mechanisms and methods can enable embodiments to instantiate modules that augment deployment and/or execution environments for applications being deployed. The ability of embodiments to provide augmented deployment and/or execution environments can enable server embodiments to become more flexible environments from the point of view of developers seeking to implement applications on the server.

In an embodiment, a method for deploying an application is provided. The method includes receiving the application to be deployed. A type of execution environment in which to deploy the application is determined. In an embodiment, the execution environment is a container that provides support to the executing application. An instance of a module associated with the type of execution environment is prepared. The module provides additional functionality for deploying the application into the execution environment. In an embodiment, one or more state machine models may be used to track the state of deploying applications.

In an embodiment, the module is prepared by a module factory responsive to a request from an application container in which the method is performed. A Module factory is a deployment interface that creates new module instances in response to receiving a module declaration. In an embodiment, each container implements a module factory configured to return modules associated with the container. The application container, upon detecting a reference to a module in a deployment descriptor, passes a module declaration to the module factory of the container associated with the module. If the module factory recognizes the module declaration, it returns an instance of the module.

While the present invention is described with reference to an embodiment in which applications are deployed in containers that are execution environments for programs written in the Java™ programming language, the present invention is not limited to containers nor the Java™ programming language and may be practiced using other execution environments and other programming languages, i.e., JSP and the like without departing from the scope of the embodiments claimed. (Java™ is a trademark of Sun Microsystems, Inc.).

Figure 1:
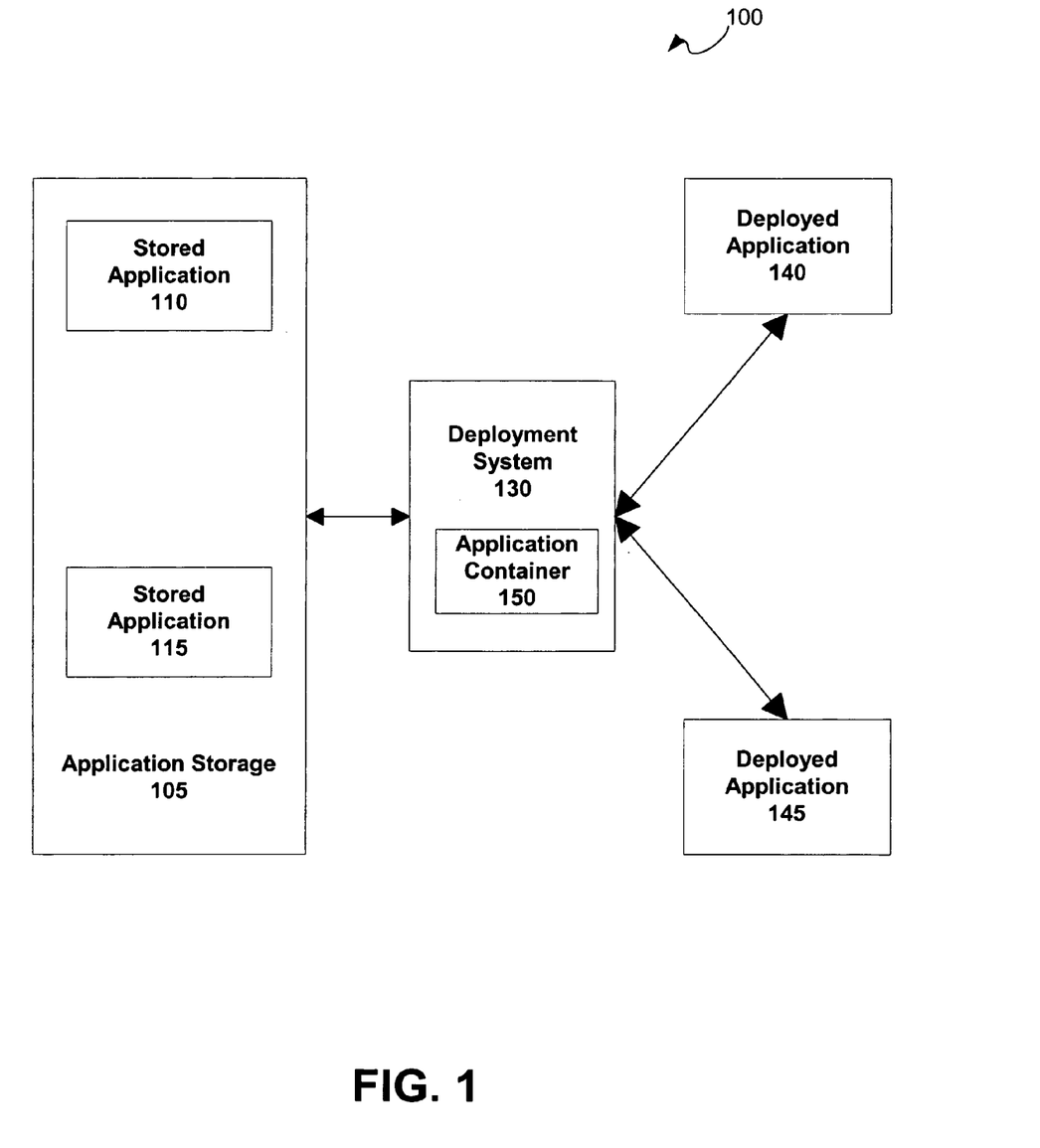
FIG. 1 illustrates an overview of an example of application deployment to a server in an embodiment.

FIG. 1 illustrates an overview of an example of application deployment to a server in an embodiment. As shown by FIG. 1, server 100 includes a storage 105 that stores multiple stored applications 110, 115 prior to deployment of these applications. In one embodiment, the server 100 utilizes an application server product, such as WebLogic® Server by BEA systems of San Jose, Calif. The applications 110, 115 may be stored as archives for deployment by a deployment system 130. In one embodiment, the applications are stored in the form of Enterprise ARchive (EAR) files or the like. The stored applications 110, 115 include modules that implement the functionality of the applications 110, 115 and deployment descriptors that indicate to the deployment system 130 how the applications 110, 115 should be deployed. The modules can include both conventional modules, i.e., modules having module types that are known to the deployment system 130, as well as custom modules, i.e., modules including the functionality for new container types.

The deployment system 130 is responsible for deploying the stored applications 110, 115 from the storage 105 to generate the deployed applications 140, 145. In one embodiment, the deployment system 130 runs when the server is started and automatically deploys a group of preselected applications. In an alternate embodiment, the deployment system 130 allows a system administrator to select which applications from applications 110, 115 are deployed. The deployment system 130 checks deployment descriptors of each of the stored applications 110, 115 to locate the modules used by the application 110, 115 within that application's EAR file, for example, and then deploys the application 110, 115 to form the deployed applications 140, 145. The deployed applications 140, 145 are then available for use by remote clients or any party interacting with the server 100. In some embodiments, the deployment system 130 includes an application container 150. The application container 150 serves as an intermediary between a deployment subsystem of the deployment system 130 and one or more target containers of an application server in which the deployed applications 140, 145 will be deployed. The application container 150 performs application class loading, Java Naming and Directory Interface (JNDI), file management and parsing of deployment descriptors.

Figure 2:
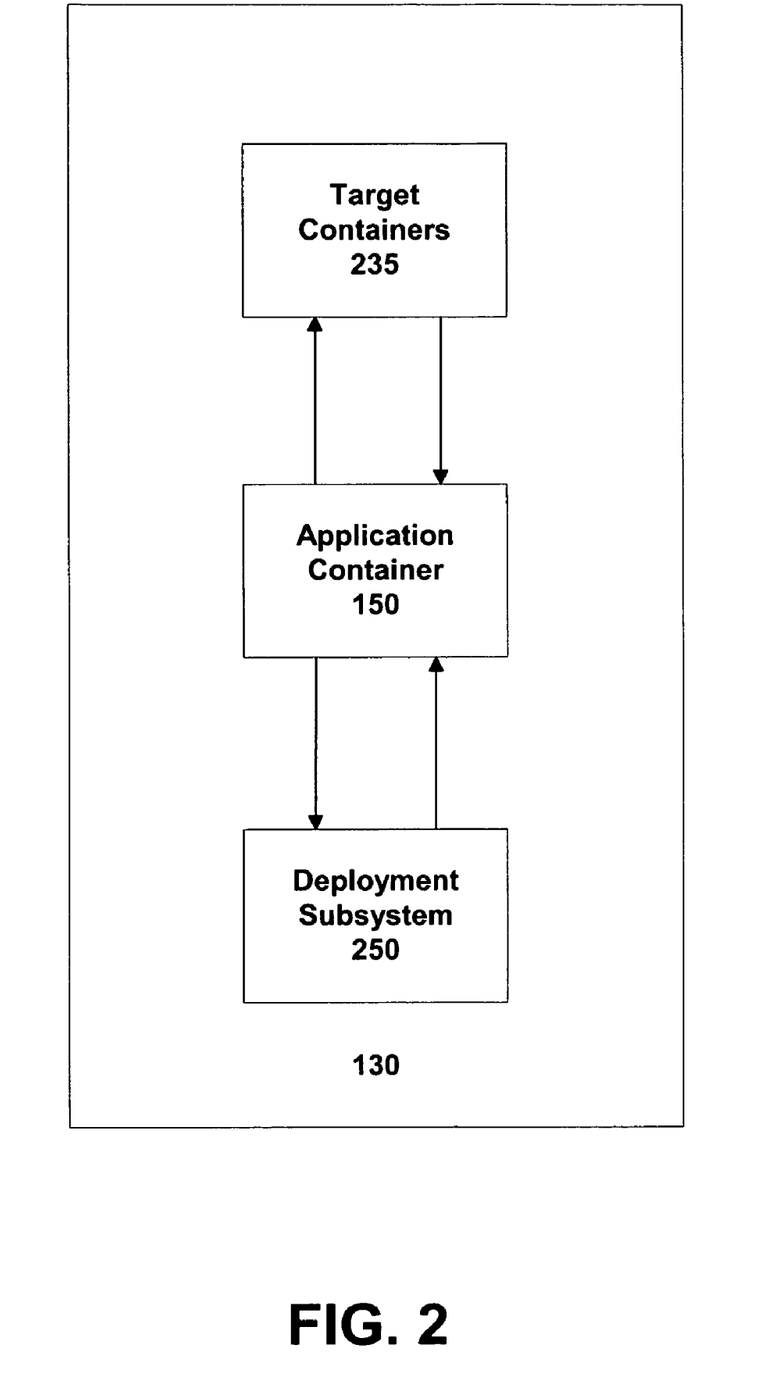
FIG. 2 illustrates a closer view of an example deployment system in an embodiment.

FIG. 2 illustrates a closer view of an example of a deployment system in an embodiment. As shown in FIG. 2, a deployment system 130 includes target containers 235, the application container 150, and the deployment subsystem 250. The deployment subsystem 250 includes functionality for extracting archived modules and loading them into system memory. The target containers 235 can be standard containers, i.e., containers that are designed to manage components such as Enterprise Java Beans (EJBs) or connectors, or custom containers, i.e., containers generated through custom modules. The application container 150 defines the interface through which the target containers 235 interface with the deployment subsystem 250. This interface can be extended through custom modules stored within applications. In one embodiment, the application container 150 includes a state machine. Application container 150 may perform various tasks such as application class loading and JNDI services in some embodiments.

The target containers 235 are modules running on an application server on which the applications are to be deployed. The target containers 235 provide runtime support and deployment assistance for components such as EJBs, JSPs and servlets. The application container 150 interacts with the target containers 235 through a standardized interface that allows the application container 150 to recognize and deploy modules of defined types.

The target containers 235 may be implemented through the server's original configuration. Alternately, the target containers 235 may be implemented through custom modules stored within an application 110, 115. For example, an application 110, 115 can be configured with custom modules containing code for new container types. The deployment system 130, upon reading the deployment descriptor of the application 110, 115, can detect the presence of a new container and implement the new container. The new container is then available for use in deploying the application.

The target containers 235 implement a Module Factory for each container type. A Module Factory is a computational entity configured to return instances of its associated module. The application container 150, when parsing a deployment descriptor, detects a call for a module of a particular type and returns an instance of that module.

Figure 3:
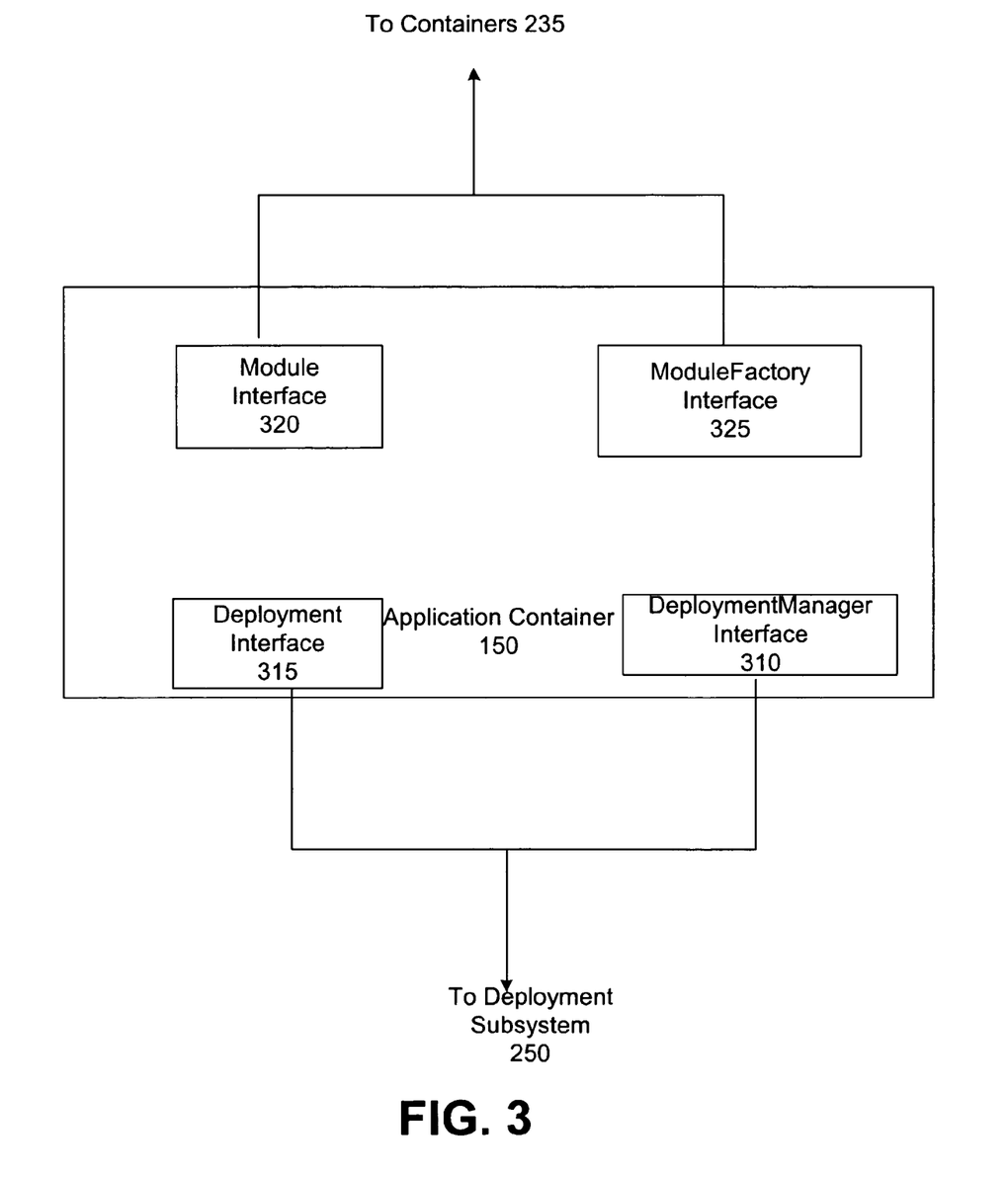
FIG. 3 illustrates a more detailed view of an example application container in an embodiment.

FIG. 3 illustrates a more detailed view of an example application container in an embodiment. As shown in FIG. 3, an application container 150 comprises multiple interfaces that it uses to bridge its interaction with the target containers 235 and the deployment subsystem 250. The application container 150 includes a Module Interface 320, a Module Factory interface 325, a Deployment interface 315 and a Deployment Manager interface 310.

The Deployment interface 315 provides a set of state transition callbacks to the deployment subsystem 250. These callbacks are configured to modify the state of an application, such as distribute, stop, start and remove. These callbacks are discussed in greater detail below with reference to FIG. 5. The Deployment Manager interface includes methods that create, find and remove deployment interfaces.

The Module Interface 320 and Module Factory interface 325 govern interaction with the containers 235. Each of the containers (EJB, Web, Connector) implements a Module Factory. The application container 150, through the Module Factory interface 325, passes module declarations to the container's Module Factory. If the container 235 recognizes the module declaration, it returns an instance of the module. For example, during deployment, the application container 150 can detect a declaration for an EJB module in a deployment descriptor of an application. The Module Factory interface 325 would then pass the module declaration to the EJB container's Module Factory, which would then return an instance of an EJB module. If the application container 150 were to pass a declaration for a different module type, such as a connector, the EJB container would return a null value.

Figure 4:
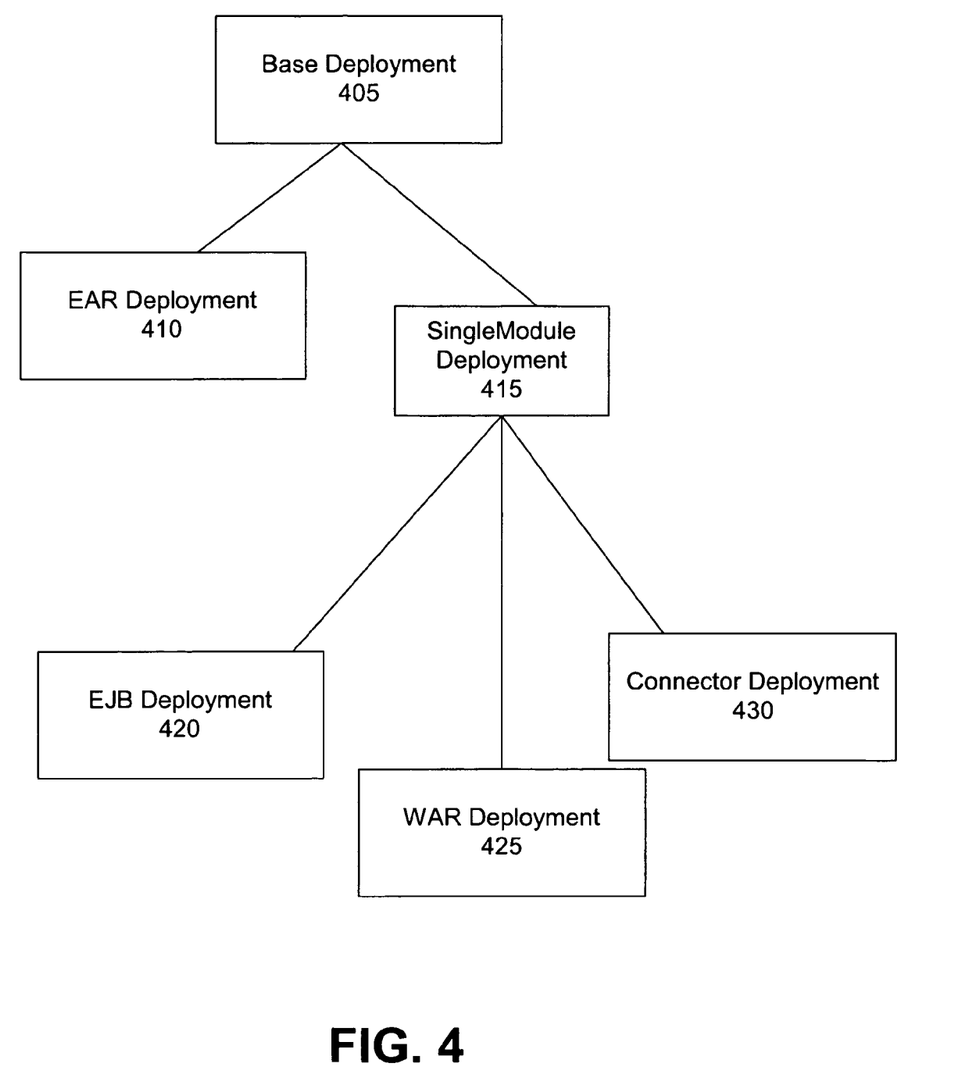
FIG. 4 illustrates a more detailed view of an example deployment architecture within an application container in an embodiment.

FIG. 4 illustrates a more detailed view of an example deployment architecture within an application container in an embodiment. The application container 150 includes multiple versions of the deployment interface 315 for differing module types. So as to better enable the addition of new module types, the module interface includes a base deployment class 405 that includes general code for deploying all module types. The deployment architecture additionally includes a group of extensions 410, 415, 420 each of which includes the functionality for a different module or application types. The architecture includes an EAR Deployment class 410 that extends the functionality of the base class to include functionality for deploying EARs.

The architecture additionally includes a Single Module Deployment class 415 that includes the base functionality for deploying single modules. The Single Module Deployment class is further extended by classes that handle the different module types. These classes include an EJB Deployment 420 class, a WAR deployment class 425, and a Connector Deployment class 430, which extend the functionality of the Single Module Deployment class to deploy EJBs, WARs and connectors respectively.

Each of the deployment classes implements a "flow". Each flow comprises an interceptor chain, with each part of the chain configured to handle specific functions of the flow, such as class loading, descriptor parsing and file management. When callbacks are received from the state machine in the deployment subsystem 130, they are passed from the Base Deployment 405 class to the appropriate class. The Base Deployment class 405 receives the callbacks in the form of an array of returned callbacks.

The application container 150 can be configured to interact with new container types by adding an extension class associated with the container type to the application container 150. Upon detecting a reference to a container for a module in the deployment descriptor for the module, the application container 150 utilizes the extension class associated with the module to request the module from the module factory associated with the appropriate target container 235.

Figure 5:
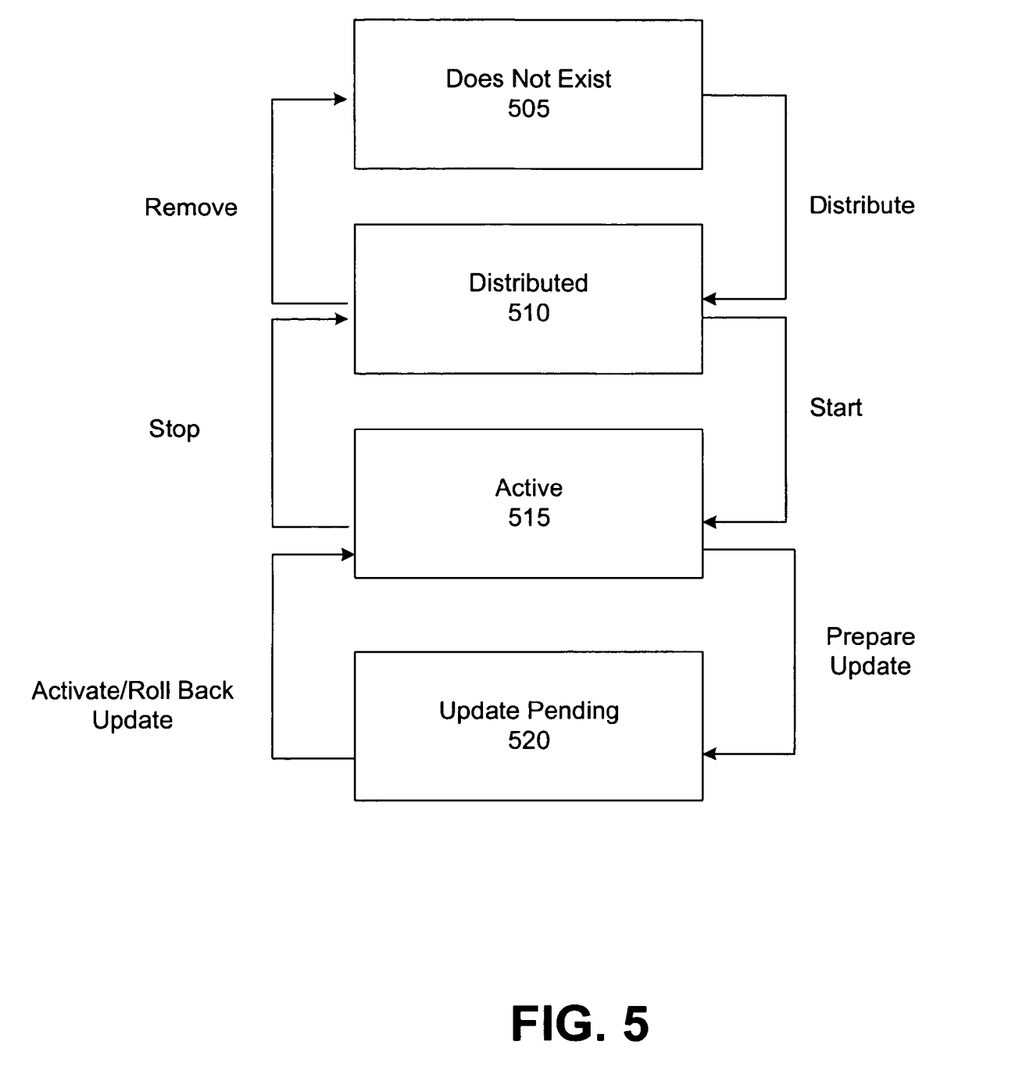
FIG. 5 illustrates a state machine for an application container in an embodiment.

FIG. 5 illustrates an example state machine for an application container in an embodiment. The state machine 500 shown in FIG. 5 represents the condition of an application and is modified when the following commands are propagated to the application from the application container 150. An application typically starts in a "Does not exist" state in which the application file hasn't been distributed from the storage 105. A "distribute" command moves the application file from storage to the deployment system 130. A "remove" command will remove the application from deployment and return its status to "does not exist" 505.

Once an application is distributed 510, a "start" command can move the application to an active state, in which the application is running. Similarly, a "stop" command can return the application to its base state. Once an application is active, it can be temporarily suspended through a "prepare update" command that shifts the application to an "update pending" state 520. The application can be returned to an "active" state by activating the update through an "activate update" command or by canceling the update with a "roll back update" command.

Additionally, a "deploy" command can be used to modify the application state. The "deploy" command performs the equivalent of "distribute" and "start" together, moving an application from a "does not exist" state 505 to an "active" state 515. An "undeploy" command combines "stop" and "remove", moving an application from an "active" state to a "does not exist" state.

Figure 6:
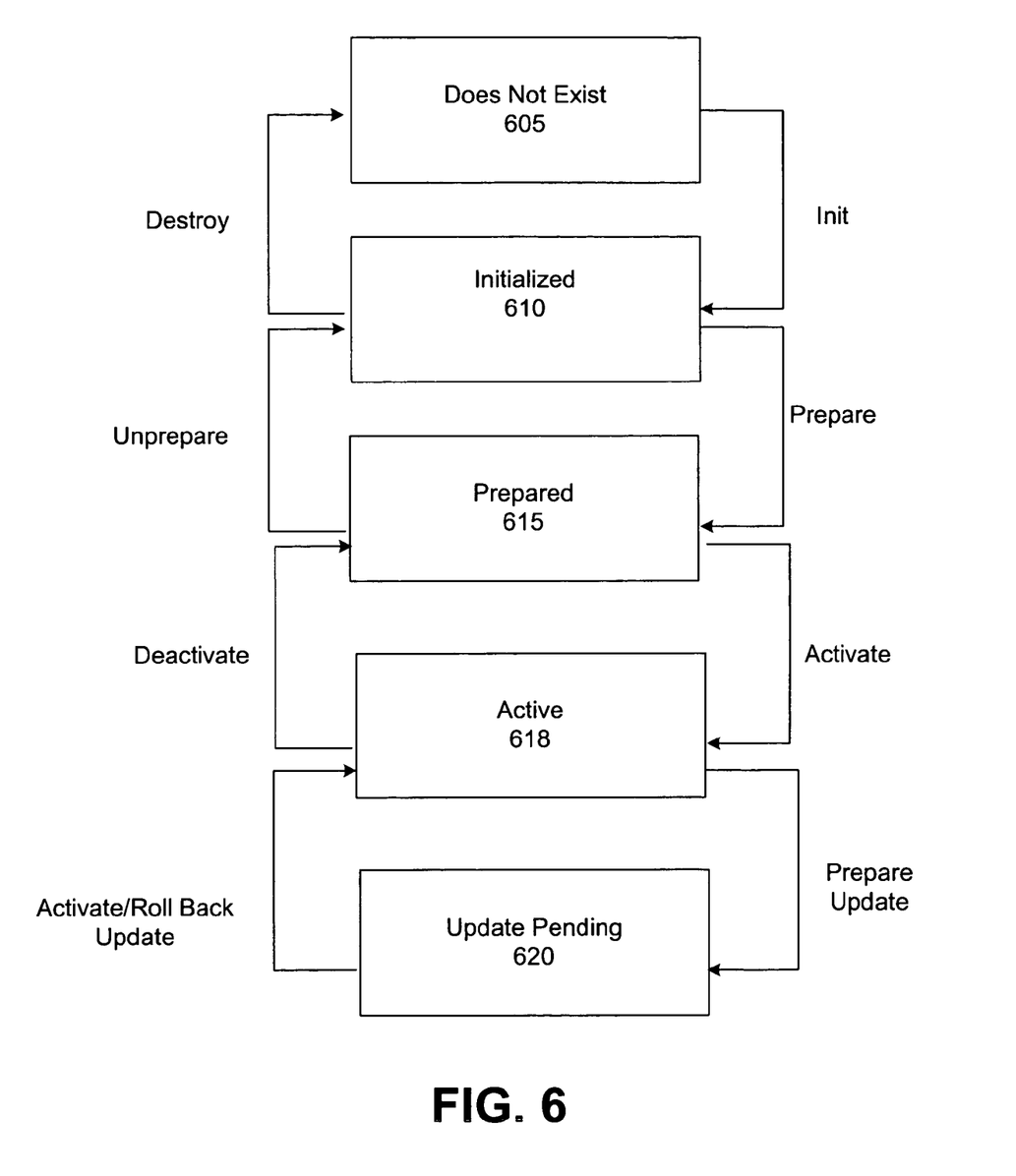
FIG. 6 illustrates an example state machine for individual modules.

FIG. 6 illustrates an example state machine for individual modules. The state machine 600 shown in FIG. 6 represents the condition of a module and is modified when the following commands are propagated to the module from the application container. A module typically starts in a "Does not exist" state in which the module hasn't been distributed from the storage 105. An "initialize" command moves the module from storage to the deployment tool. A "destroy" command will remove the module from deployment and return its status to "does not exist" 605.

Once a module is initialized 610, a "prepare" command can move the module to a prepared state 615, in which the module's descriptors are parsed and a host container for the module has been initialized. Similarly, an "unprepare" command can return the module to an initialized state 610. An "activate" command moves the module to an "active" state 618 in which it is available for use. A "deactivate" command moves the module to an unprepared state.

Once a module is active, it can be temporarily suspended through a "prepare update" command that shifts the module to an "update pending" state 620. The module can be returned to an "active" state by activating the update through an "activate update" command or by canceling the update with a "roll back update" command.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention.

What is claimed:

1. A method for deploying applications, the method comprising:
   maintaining an application container and a plurality of target containers;
   invoking the application container to deploy the application;
   parsing a deployment descriptor of the application to be deployed by said application container;
   detecting, in the deployment descriptor of an application, a presence of a new target container type, wherein the application container is configured to interact with the new target container type by adding an extension class associated with the new target container type to the application container;
   utilizing the extension class by the application container in order to request a module from a factory associated with the new target container by passing a module declaration based on said extension class to the new target container; and
   returning an instance of said module by the factory if the new target container recognizes the module declaration.

2. The method of claim 1, wherein utilizing the extension further includes:
   retrieving a class that adds functionality to a base class comprising functionality for deploying modules.

3. The method of claim 1, wherein the module is at least one of: an Enterprise Java Bean (EJB), a web application, and/or a connector.

4. The method of claim 1, wherein detecting, in a deployment descriptor of an application, a presence of a new container type further includes:
   detecting a reference to a specific container for a module in the deployment descriptor.

5. The method of claim 1, wherein utilizing the extension further includes:
   requesting that an instance of the module be instantiated based upon a type of the extension.

6. The method of claim 5, further comprising:
   receiving an instance of the module responsive to the request.

7. A machine readable medium having instructions stored thereon, which instructions when executed by a processor cause a system to perform the following steps:
   maintaining an application container and a plurality of target containers;
   invoking the application container to deploy the application;
   parsing a deployment descriptor of the application to be deployed by said application container;
   detecting, in the deployment descriptor of an application, a presence of a new target container type, wherein the application container is configured to interact with the new target container type by adding an extension class associated with the new target container type to the application container;
   utilizing the extension class by the application container in order to request a module from a factory associated with the new target container by passing a module declaration based on said extension class to the new target container; and
   returning an instance of said module by the factory if the new target container recognizes the module declaration.

8. The machine readable medium of claim 7, wherein the instructions for utilizing the extension further include instructions that when executed by the processor cause the system to perform the step of:
   retrieving a class that adds functionality to a base class comprising functionality for deploying modules.

9. The machine readable medium of claim 7, wherein the module is at least one of: an Enterprise Java Bean (EJB), a web application, and/or a connector.

10. The machine readable medium of claim 7, wherein the instructions for detecting, in a deployment descriptor of an application, a presence of a new target container type further include instructions that when executed by the processor cause the system to perform the step of:
    detecting a reference to a specific container for a module in the deployment descriptor.

11. The machine readable medium of claim 7, wherein the instructions for utilizing the extension further include instructions that when executed by the processor cause the system to perform the step of:
    requesting that an instance of the module be instantiated based upon a type of the extension.

12. The machine readable medium of claim 11, further comprising instructions that when executed by the processor cause the system to perform the step of:
    receiving an instance of the module responsive to the request.

13. A computer-readable storage medium storing instructions for deploying an application, the instructions comprising:
    an application container including a deployment interface for module types;
    a module interface including a base deployment class for deploying module types;
    a deployment architecture including a plurality of extensions for EAR deployment, single module deployment, and EJB deployment, wherein the plurality of extensions are classes that extend the functionality of the base deployment class; and
    one or more stored sequences of instructions which carry out the steps of:
      invoking the application container to deploy the application;
      parsing a deployment descriptor of the application to be deployed by said application container;
      detecting, in the deployment descriptor of an application, a presence of a new target container type, wherein the application container is configured to interact with the new target container type by adding an extension class associated with the new target container type to the application container;
      utilizing the extension class by the application container in order to request a module from a factory associated with the new target container by passing a module declaration based on said extension class to the new target container; and
      returning an instance of said module by the factory if the new target container recognizes the module declaration.

14. A server apparatus, comprising:
    a processor;
    an application container including a deployment interface for module types;
    a module interface including a base deployment class including code for deploying module types;
    a deployment architecture including a plurality of extensions for EAR deployment, single module deployment, and EJB deployment, wherein the plurality of extensions are classes that extend the functionality of the base deployment class; and one or more stored sequences of instructions which, when executed by the processor, cause the processor to carry out the steps of:

invoking the application container to deploy the application;

parsing a deployment descriptor of the application to be deployed by said application container;

detecting, in the deployment descriptor of an application, a presence of a new target container type, wherein the application container is configured to interact with the new target container type by adding an extension class associated with the new target container type to the application container;

utilizing the extension class by the application container in order to request a module from a factory associated with the new target container by passing a module declaration based on said extension class to the new target container; and     returning an instance of said module by the factory if the new target container recognizes the module declaration.

15. A computer readable storage medium storing instructions, the instructions comprising:

maintaining an application container and a plurality of target containers;

invoking the application container to deploy the application;

parsing a deployment descriptor of the application to be deployed by said application container;

detecting, in the deployment descriptor of an application, a presence of a new target container type, wherein the application container is configured to interact with the new target container type by adding an extension class associated with the new target container type to the application container;

utilizing the extension class by the application container in order to request a module from a factory associated with the new target container by passing a module declaration based on said extension class to the new target container; and     returning an instance of said module by the factory if the new target container recognizes the module declaration.

16. The method of claim 1, wherein the application container provides a set of state transition callbacks to a deployment subsystem.

* * * * *

UNITED STATES PATENT AND TRADEMARK OFFICE
CERTIFICATE OF CORRECTION

PATENT NO. : 7,707,572 B2  Page 1 of 1
APPLICATION NO. : 11/132519
DATED : April 27, 2010
INVENTOR(S) : Rob Woollen It is certified that error appears in the above-identified patent and that said Letters Patent is hereby corrected as shown below:

On the title page, item [56];
On page 2, in column 2, under "Other Publications", line 1, delete "Enteprise" and insert
-- Enterprise --, therefor.

Signed and Sealed this
Twelfth Day of April, 2011

David J. Kappos
*Director of the United States Patent and Trademark Office*